Aug. 29, 1939.    R. C. JACOBS    2,170,923
SEAT TRACK AND RISER
Filed Feb. 27, 1937    3 Sheets-Sheet 1

Inventor
Rex C. Jacobs
By
Attorneys

Aug. 29, 1939.　　　　R. C. JACOBS　　　　2,170,923
SEAT TRACK AND RISER
Filed Feb. 27, 1937　　　3 Sheets-Sheet 2

Inventor
Rex C. Jacobs
By
Attorneys

Aug. 29, 1939.        R. C. JACOBS        2,170,923
SEAT TRACK AND RISER
Filed Feb. 27, 1937        3 Sheets-Sheet 3
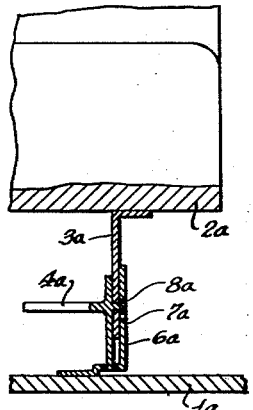
Fig. 7.
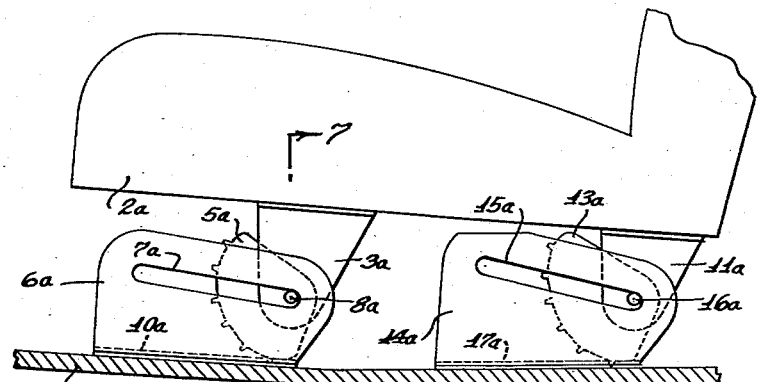
Fig. 6.
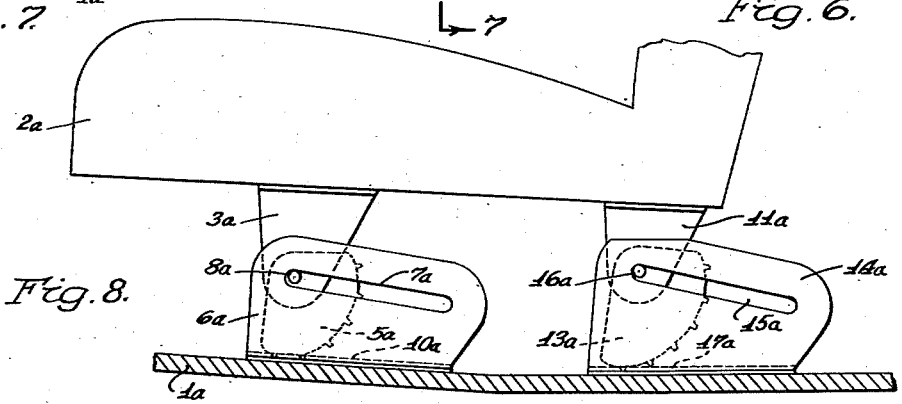
Fig. 8.
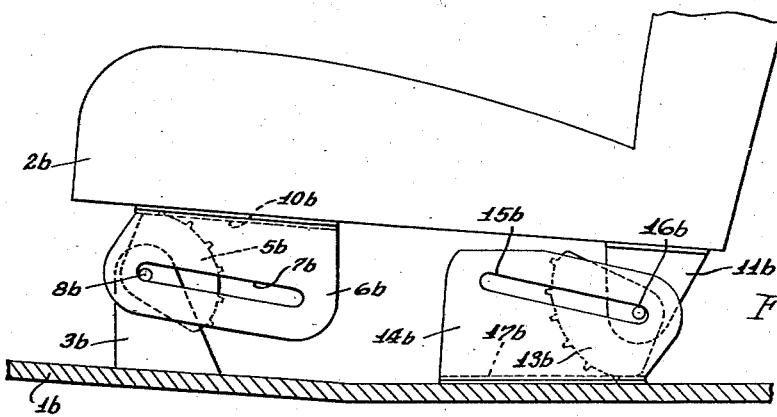
Fig. 9.
Inventor
Rex C. Jacobs
By
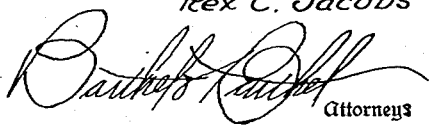
Attorneys Patented Aug. 29, 1939

2,170,923

UNITED STATES PATENT OFFICE 2,170,923

SEAT TRACK AND RISER

Rex C. Jacobs, Detroit, Mich.

Application February 27, 1937, Serial No. 128,245

8 Claims. (Cl. 155—14)

The present invention relates to a novel seat track and riser for supporting the front or driver's seat of an automobile whereby the seat may be adjusted to suit the physical requirements of different drivers.

The primary object of the present invention is to provide a seat track and riser for supporting a seat for adjustment movement, forwardly or rearwardly of a vehicle, and for causing a tilting action incident to the forward and rearward movements. That is, as the seat is moved forwardly the riser mechanism functions to tilt the seat forwardly, and as the seat moves rearwardly, the riser mechanism functions to tilt the seat rearwardly.

Another object of the invention is to provide a seat track and riser for an automobile seat which functions to elevate the seat as it moves forward and to lower the seat as it moves rearwardly. In regard to this function, the riser mechanism is so designed that during forward movement of the seat the rear edge of the seat is elevated more rapidly than the front edge, with the result that the seat is tilted. During rearward movement of the seat, the riser functions to lower the rear edge of the seat more rapidly than the front edge, with the result that the seat is tilted opposite to the direction of the tilting which is incident to forward movement thereof.

Another object of the invention is to provide a seat track and riser having a novel arrangement of eccentric gear sectors meshing with racks, the eccentric gear sectors and racks being so supported with respect to the seat and the floor of a vehicle whereby movement of the seat forwardly or rearwardly causes rotation of the eccentric gear sectors. The eccentric gear sectors are so disposed that their rotative movement which accompanies forward movement of the seat causes the latter to be elevated, and the opposite rotative movement which accompanies rearward movement of the seat causes the latter to be lowered. The eccentric gear sectors which support the forward edge of the seat are so proportioned with respect to those supporting the rear edge of the seat that during forward movement the rear edge of the seat is elevated more rapidly than the front edge, and during rearward movement the rear edge of the seat is lowered more rapidly than the front edge.

With the above and other objects in view the invention is more fully disclosed with reference to the accompanying drawings, in which Figure 1 is a side elevation, partly in section;

Figs. 6 and 8 are elevations illustrating a reversed arrangement of the seat track and riser;

Fig. 7 is a section taken on the line 7—7 of Fig. 6, and

Fig. 9 is an elevation illustrating a combination of the first two arrangements.

Like characters of reference are employed throughout to designate corresponding parts.

Figure 1:
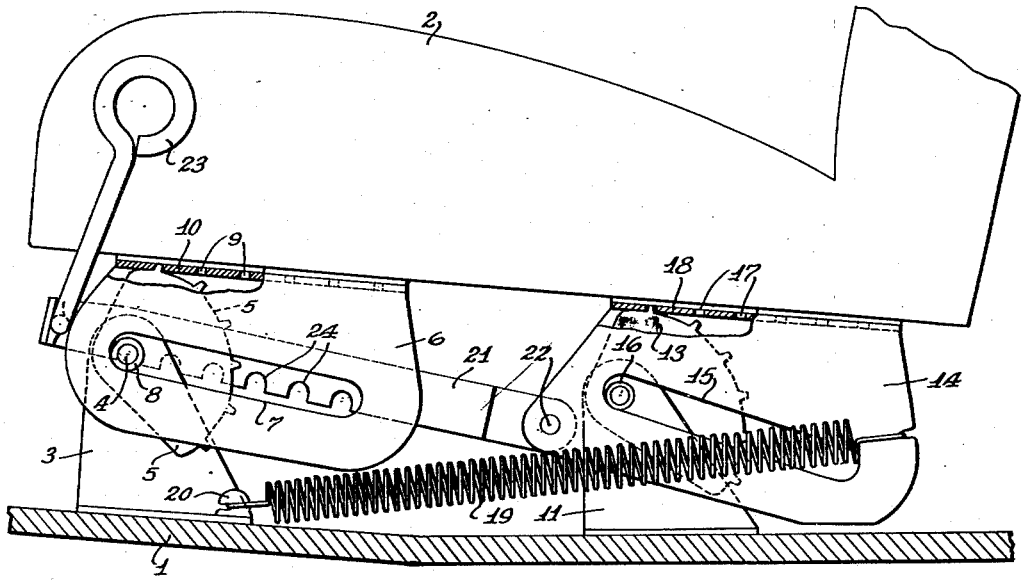

The numeral 1 designates a support, such as the floor of an automobile, and 2 designates the automobile seat. Secured to the support 1, adjacent the plane of the front edge of the seat 2, are two brackets 3. A rod or shaft 4 is rotatably supported by the brackets 3 and on the rod 4, adjacent each bracket 3, is fixed or integrally formed an eccentric gear sector 5. Secured to the seat 2 adjacent the brackets 3 are brackets 6 having inclined slots 7 receiving rollers 8 on the adjacent ends of the rod or shaft 4. The brackets 6 also have a rack formation thereon formed by providing spaced apertures 9 in the walls 10 thereof. As will be seen upon reference to the drawings, the rollers 8 engage the lower walls of their respective slots 7 and maintain the brackets 3 and 6 in a position with the eccentric gear sectors 5 contacting the bracket walls 10 and with the teeth on the gear sectors in a position for meshing engagement with the apertures 9 therein.

Spaced rearwardly from the brackets 3 and secured to the support 1 are brackets 11. Rotatably supported on each bracket 11 by a stub shaft 12 is an eccentric gear sector 13. Adjacent each floor bracket 11 a bracket 14 is secured to the bottom of the seat 2 and each bracket 14 has an inclined slot 15 therein. Each stub shaft 12 carries a roller 16 which engages the bottom surface of the groove 15 to maintain the adjacent eccentric gear sector 13 in contact with the wall 17 of the bracket 16, so that the teeth of the gear sector may mesh with apertures 18 therein. The wall 17 with the apertures 18 therein thus constitute a rack.

Figure 2:
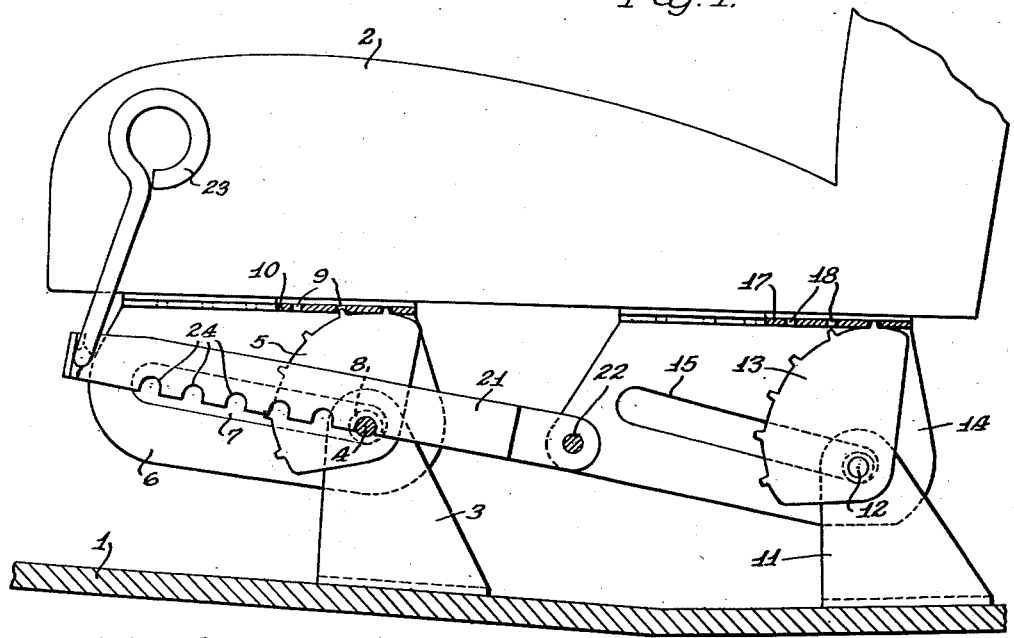
Fig. 2 is a sectional view, showing the parts in a different position, the seat being shown in elevation.
Figure 3:
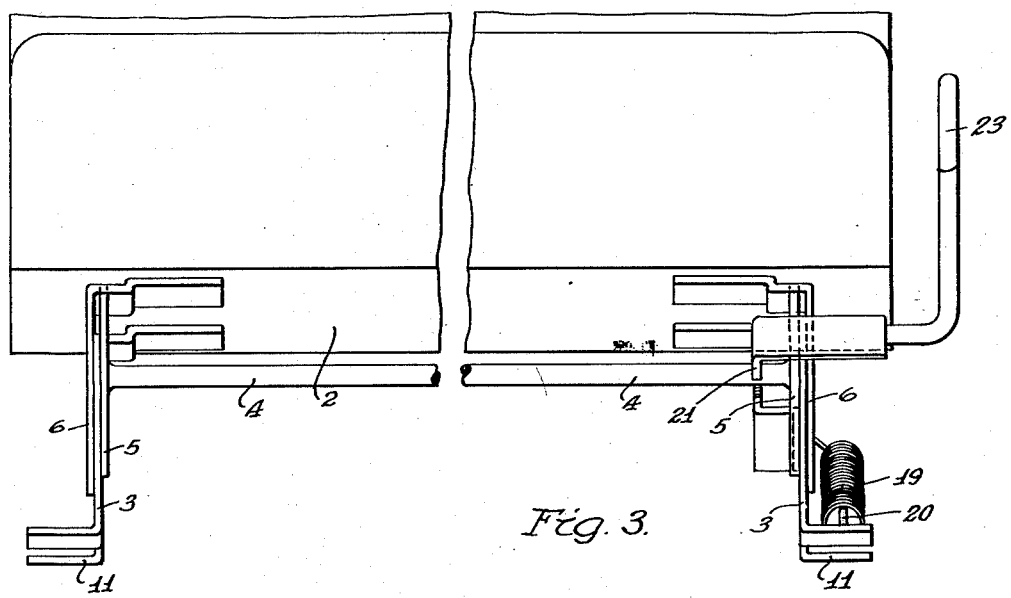
Fig. 3 is a front elevation of the seat, seat track and riser.
Figures 4, 5:
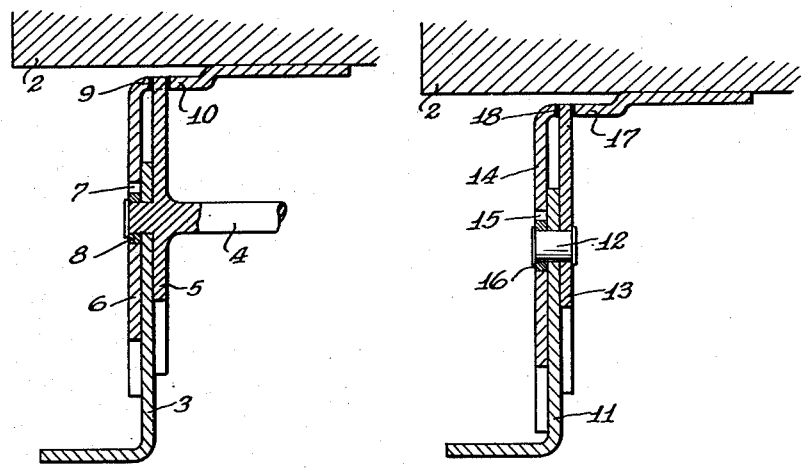
Fig. 4 is a vertical section of the front support for the seat.
Fig. 5 is a vertical section illustrating the rear support for the seat.

The two sets of eccentric gear sectors 5 and 13 are thus supported for rolling contact with their respective racks 10 and 17 and as the seat is moved forwardly, from the position shown in Fig. 1 to that shown in Fig. 2 the distance between the axes of the shafts 4 and 12 increases, due to the fact that the elements 5 and 13 are eccentric gear sectors. As the seat is moved rearwardly, from the position shown in Fig. 2 to that shown in Fig. 1, the eccentric gear sectors function to decrease the distance between the axes of the shafts 4 and 12, or in other words, cause the seat to be lowered. The slots 7 and 15, in the brackets 6 and 14 respectively, are inclined at an angle whereby the lower walls thereof contact respective rollers 8 and 16 during such movement of the seat and maintain the gear sectors in contact with their respective racks and the seat 2 in proper position with respect to the floor brackets 3 and 11.

The eccentric gear sectors 5 and 13 are relatively proportioned whereby during equal angular movements the radii of the sectors 13 increase in length more rapidly than the radii of the gear sectors 5. This arrangement causes the rear edge of the seat to be elevated and lowered more rapidly than the front edge during forward and rearward movements of the seat.

With a seat track and riser of the character above described there is a natural tendency for the seat to move rearwardly and a greater amount of pressure must be exerted to move the seat forwardly than rearwardly. To overcome this tendency and to assist forward movement of the seat a coiled spring 19 has one end connected to a hook 20 on one of the forward floor brackets 3, and its other end connected to one of the brackets 14 which are attached to the seat. The spring 19 normally urges forward movement of the seat.

In order to positively hold the seat in any position of adjustment an arm 21 is pivotally connected, as at 22, to one of the brackets 14 and extends forwardly above the shaft 4. The free end of the arm 21 has a handle piece 23 thereon for swinging the same, manually, about the connecting means 22. The arm 21 has a series of notches 24 therein, the walls of which are adapted to engage the shaft 4 to hold the seat 2 against movement.

In the structure above described it will be noted that the points of support for the rear of the seat must be disposed remote from the rear edge of the seat in order that the rear edge of the brackets 14, which are secured to the seat, will not project beyond the rear edge of the seat. As will become apparent, as the structure shown in Figs. 6, 7 and 8 is described, it is possible to bring the points of support nearer to the rear edge of the seat by reversing the arrangement above described. That is, instead of supporting the eccentric gear sectors on floor brackets whereby their axes of rotation are fixed, the eccentric gear sectors are mounted upon the seat and the racks with which they mesh are attached to the floor or support. Mounting the eccentric gear sectors on the floor brackets has an important advantage, however, in that the gear sectors are spaced from the floor and there is no possibility of floor coverings etc. interfering with proper engagement of the gear sectors with their respective racks.

Referring to Figs. 6, 7 and 8, the numeral 5a designates eccentric gear sectors, mounted upon a shaft 4a, the shaft 4a being rotatably supported with respect to the seat 2a by brackets 3a. The gear sectors 5a are held in contact with a rack 10a by engagement of rollers 8a with the top wall of slots 7a in brackets 6a which are attached to the floor or support 1a. Eccentric gear sectors 13a are rotatably supported by brackets 11a, which are attached to the seat 1a adjacent the rear edge thereof. The eccentric gear sectors 13a are held in contact with racks 17a by engagement of rollers 16a, on their supporting shafts, with the top walls of grooves 15a in the brackets 14a which are attached to floor or support 1a.

The two sets of eccentric gear sectors 5a and 13a are relatively proportioned whereby rotation thereof accompanying forward movement of the seat 2a from the position shown in Fig. 6 to that shown in Fig. 8 causes the rear edge to elevate more rapidly than the forward edge.

The form illustrated in Fig. 9 shows how the points of support for the seat may be disposed in close proximity to the front and rear edges of the seat by mounting one eccentric gear sector on the floor or support and the other on the seat. In this view, the numeral 5b designates one of the forward gear sectors which are supported by brackets 3b on the floor 1b. The gear sectors 5b are held in contact with their respective racks by engagement of rollers 8b with the lower wall of an inclined groove 7b in the brackets 6b which are attached to the seat 2b. The rear set of eccentric gear sectors 13b are supported by brackets 11b which are attached to the seat and are held in contact with their respective racks 17a by the rollers 16b in the inclined slots 15b in the brackets 14b which are attached to the floor 1b.

In the forms of the invention shown in Figs. 6 to 8 and Fig. 9 the spring biasing means has not been shown, nor has the lock which holds the seat in various positions of adjustment. These parts have been omitted in the interest of clarity, in the belief that it is obvious to those skilled in the art that the spring 19, shown in the drawings and described above, may be used in connection with the last two described embodiments. It is also obvious that the notched arm 21 may be attached to either of the brackets 11a or 11b to function in the manner above described.

As will be understood, the assembly includes structures which combinedly form a stationary supporting means—indicated, for instance, by brackets 3 and 11 (Fig. 2), brackets 6a and 14a (Fig. 6), or brackets 3b and 14b (Fig. 9)—and movable supporting means carried by the seat and movable forwardly and rearwardly with the seat, and exemplified, for instance, by brackets 6 and 14 (Fig. 2), brackets 3a and 11a (Fig. 6) and brackets 6'' and 11b (Fig. 9). The forward and rearward movement of the seat is controlled by the asymmetrical eccentrics and the guiding means in the form of the bracket slots and rollers, the slots extending at different angles to the horizontal to permit the free movement of the eccentrics and yet maintain contact of the eccentrics with the other supporting means.

Although specific embodiments of the invention have been illustrated and described it will be understood that various changes may be made within the scope of the appended claims without departing from the spirit of the invention, and such changes are contemplated.

What I claim is:

1. A seat track and riser comprising relatively movable elements adapted for attachment to a support and to a seat respectively, and fore and aft eccentrics rotatably supported by one of the movable elements and having rolling contact with the other of said movable elements, said eccentrics comprising rolling means supporting said seat for forward and rearward adjustment movement, and said eccentric members being formed whereby they elevate the seat incident to forward movement and lower the seat incident to rearward movement, the eccentricity of the fore and aft eccentrics being varied whereby the rear edge of the seat elevates more rapidly and lowers more rapidly than the forward edge incident to forward and rearward movements respectively.

2. In combination with relatively movable members adapted for attachment to a support and to a seat respectively, one of the movable members constituting a rack, eccentric gear sectors carried by the other of said movable members for rolling contact with said rack, said eccentrics comprising anti-friction means supporting the seat for forward and rearward adjustment movement, said eccentrics being disposed whereby they elevate the seat incident to forward movement thereof and lower the seat incident to rearward movement, said eccentric gear sectors being adapted to be spaced between the fore and aft edges of the seat, and the aft gear sectors having greater eccentricity than the fore sectors whereby the rear edge of the seat elevates more rapidly and lowers more rapidly than the forward edge incident to forward and rearward movements respectively.

3. In combination, brackets adapted for attachment to a support, brackets adapted for attachment to a seat, racks on said first-named brackets, eccentric gear sectors on the other brackets and having rolling contact with said racks, said rack carrying brackets having slots therein, and rollers co-axial with said sectors and extending into respective slots.

4. In combination, fore and aft brackets adapted for attachment to a support, fore and aft brackets adapted for attachment to a seat, racks on the first mentioned brackets, and eccentric gear sectors on the second mentioned brackets contacting with said racks, the eccentricity of the gear sectors supported by the aft brackets being greater than that of the sectors supported by the fore brackets.

5. In combination, fore and aft brackets adapted for attachment to a support, fore and aft brackets adapted for attachment to a seat, racks on the first mentioned brackets, eccentric gear sectors on the second mentioned brackets contacting with said racks, the eccentricity of the gear sectors supported by the aft brackets being greater than that of the sectors supported by the fore brackets, and rollers supported concentric with said gear sectors, said first mentioned brackets having slots receiving said rollers.

6. In combination, fore and aft brackets adapted for attachment to a support, fore and aft brackets adapted for attachment to a seat, racks on the second mentioned brackets, eccentric gear sectors on the first mentioned brackets contacting with said racks, the eccentricity of the gear sectors supported by the aft brackets being greater than that of the sectors supported by the fore brackets, said eccentrics being disposed whereby forward movement of the seat causes elevation thereof and rearward movement causes the seat to be lowered, and spring means normally urging the seat forward.

7. A seat structure for vehicles comprising, supporting means, second supporting means for the seat and arranged for forward and rearward movement relative to said first-named supporting means, and eccentrics rotatably supported by one of said supporting means and having rolling contact with the other of said supporting means, said eccentrics being operable for bodily moving the seat forward and backward and for also raising and lowering the seat, said eccentrics being asymmetrical to each other, said supporting means including front and rear guiding means for controlling the path of movement of the seat, the front guiding means presenting an angle differing from that of the rear guiding means with the respective angles such as to maintain contact of the eccentrics with the other contacting supporting means.

8. A seat structure for vehicles comprising, supporting means, seat means bodily movable forwardly and rearwardly, and eccentrics carried by one of said means and engaging said other means for supporting said seat on said supporting means, said eccentrics being operable on forward and rearward movement of said seat to correspondingly raise and lower said seat relative to said supporting means, said eccentrics being asymmetrical to each other, said supporting and seat means including front and rear guiding means for controlling the path of movement of the seat, the front guiding means presenting an angle differing from that of the rear guiding means with the respective angles such as to maintain contact of the eccentrics with the other contacting means constituting the support with which the eccentrics co-operate.

REX C. JACOBS.